Sept. 29, 1970    H. FURKERT    3,531,240
PROCESS FOR THE PRODUCTION OF SODIUM BICARBONATE AND SODA ASH
Filed Feb. 13, 1968
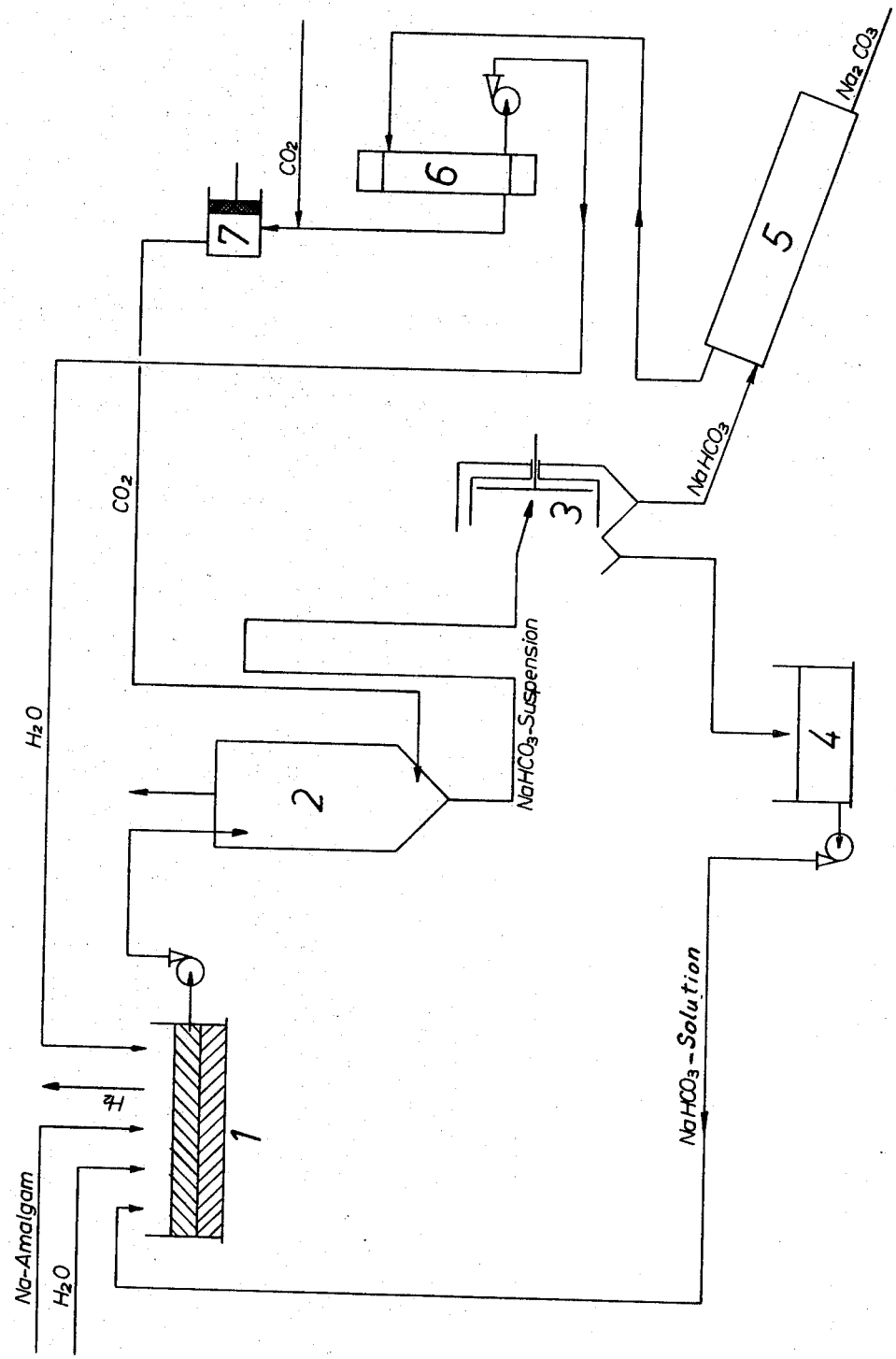
INVENTOR
HERBERT FURKERT
BY J. William Millen
ATTORNEY

United States Patent Office 3,531,240
Patented Sept. 29, 1970

3,531,240
PROCESS FOR THE PRODUCTION OF SODIUM BICARBONATE AND SODA ASH
Herbert Furkert, Starenweg, Germany, assignor to Chemiebau Dr. A. Zieren GmbH & Co., KG, Cologne, Braunsfeld, Germany
Filed Feb. 13, 1968, Ser. No. 705,192
Claims priority, application Germany, Feb. 24, 1967,
C 41,606
Int. Cl. C01d 7/00, 7/12
U.S. Cl. 23—63                    10 Claims

ABSTRACT OF THE DISCLOSURE

A process for the preparation of sodium carbonate comprising: (a) reacting sodium amalgam produced by mercury cathode cells of the chlorine process with an aqueous sodium bicarbonate solution to form a solution containing sodium carbonate and sodium hydroxide; (b) treating the sodium carbonate and sodium hydroxide solution with carbon dioxide to form sodium bicarbonate; (c) separating solid sodium bicarbonate and a sodium bicarbonate containing mother liquor; (d) recirculating the sodium bicarbonate containing mother liquor to react with the sodium amalgam; and (e) calcining the separated sodium bicarbonate to produce sodium carbonate.

BACKGROUND OF THE INVENTION

The field of the invention is alkali metal carbonate generally and the chemical processes for the preparation of sodium carbonates particularly.

The state of the prior art may be ascertained by reference to Kirk-Othmer, "Encyclopedia of Chemical Technology," 2nd ed., vol. 1 (1963) under the sections "Mercury Cathode Cells," pages 688–698, "Sodium Carbonate," pages 707–740, and "Sodium Hydroxide," pages 740–758. Examples of the mercury cathode cells used to produce the sodium amalgam starting materials of the present invention are disclosed in Kirk-Othmer, "Encyclopedia of Chemical Technology," 1st ed., vol. 1 (1947), pages 375–377. The method and apparatus for carrying out centrifugal filtration is set forth in Kirk-Othmer, "Encyclopedia of Chemical Technology," 2nd ed., vol. 4 (1964), pages 732–734 and 748–755. The methods of converting sodium hydroxide produced by the mercury cathode cells of the chlorine process into carbonates by treatment with gaseous carbon dioxide or sodium bicarbonate and sodium carbonate are disclosed in the German Patent 1,141,627 and the German Auslegeschrift 1,232,936, respectviely.

The carbonation of sodium hydroxide solution resulting from the mercury cathode cells of the chlorine process with gaseous carbon dioxide to form $Na_2CO_3 \cdot H_2O$ is known. The disadvantage with this process is that the solution remaining after the precipitate has been separated contains a considerable amount of soda. This product must be obtained by evaporating the solution and a considerable number of difficulties are inherent therein. The solubility of $Na_2CO_3$ decreases with increasing temperature so that encrustations are formed on the heat exchange surfaces of the evaporator whereby the efficiency of the evaporator is impaired and the process is made uneconomical.

It is also conventional to carbonate the sodium hydroxide solution so that all the water contained in the sodium hydroxide solution is bound as water of hydration. By this process the expensive separation of water by centrifuging, filtering or evaporation is avoided. Sodium bicarbonate and sodium carbonate are employed for carbonating the sodium hydroxide solution in amounts equivalent to the sodium hydroxide solution. This process is restricted to a combination with an ammonia soda ash process because the considerable amount of sodium bicarbonate required is generally available only in a soda ash plant.

SUMMARY OF THE INVENTION

It is therefore an object of the present invention to avoid the above-mentioned disadvantages of the direct soda precipitation by producing soda ash from sodium amalgam, carbon dioxide and water.

The production of chlorine by electrolysis in a mercury cathode type of alkali chlorine cell has achieved increased economic importance without any corresponding increase in utility of the sodium hydroxide made available thereby. It has therefore become a practice to convert the sodium hydroxide solution into soda ash, which is more readily sold than the sodium hydroxide solution.

In the mercury cathode type of alkali chlorine cell, continuously fed brine is partly decomposed in one compartment (called the electrolyzer) between a graphite anode and a moving mercury cathode, forming chlorine gas at the anode and sodium amalgam at the cathode. The sodium amalgam flows continuously to a second compartment, called the amalgam decomposer, where it becomes the anode to a short circuited iron or graphite cathode in an electrolyte of sodium hydroxide solution. Purified water is fed to the decomposer, generally countercurernt to the sodium amalgam; hydrogen gas is formed, and the electrolyte increases in sodium hydroxide content. A solution containing from 30–70% sodium hydroxide at high purity overflows from the decomposer. The denuded mercury is collected in a small reservoir and recycled continuously to the main cell by a centrifugal pump mounted on each cell. In usual practice, the amalgam leaves the electrolyzer containing 0.2% sodium by weight and is returned with less than 0.02% sodium by weight.

According to the present invention the sodium amalgam is treated with an aqueous sodium bicarbonate solution to form a solution containing sodium carbonate and sodium hydroxide. The resulting solution is treated with carbon dioxide and the sodium bicarbonate formed is separated by filtration into a sodium bicarbonate cake and sodium bicarbonate containing mother liquor. The sodium bicarbonate containing mother liquor is recirculated for reuse with the sodium amalgam. The sodium bicarbonate cake is calcined to soda ash to produce the end product.

Contrary to the prior art processes, the sodium amalgam is not reacted with water but with sodium bicarbonate solution. The sodium bicarbonate solution is obtained after precipitation and separation of the sodium bicarbonate by centrifuging or filtering as a centrifuge product or a filtrate. Substantially all of the water necessary for reacting with the sodium amalgam is continuously recycled through the plant and only the amount of water removed with the sodium bicarbonate cake must be replaced.

The process of the present invention is based on the observation that a sodium bicarbonate containing filtrate can be reacted without difficulty with sodium amalgam, whereas an $Na_2CO_3$ containing filtrate forms a precipitate during the reaction with the sodium amalgam. It is very difficult to separate these $Na_2CO_3$ precipitates from the denuded mercury. As compared to the $Na_2CO_3$ precipitation the precipitation with sodium bicarbonate has the particular advantage that the amalgam can be reacted with the mother liquor remaining after separation of the precipitte in a simple manner, e.g. by centrifuging or filtering. Consequently, a special step for recovering the $NaHCO_3$ still present in the solution is unnecessary.

BRIEF DESCRIPTION OF THE DRAWING

The process of the present invention is illustrated by the flowsheet shown in the drawing. In the drawing, sodium amalgam is treated with sodium bicarbonate solution in decomposer 1. The reaction products of decomposer 1 are circulated to carbonating tower 2 for treatment with carbon dioxide and the sodium bicarbonate suspension resulting therefrom is separated in centrifugal filter 3 into a sodium bicarbonate cake and a mother liquor. The sodium bicarbonate cake is removed from the centrifugal filter and calcined in rotating calciner 5 to produce the soda ash. The sodium bicarbonate mother liquor solution separated from the centrifugal filter 3 is fed to collecting vessel 4 from which it is returned to the amalgam decomposer. The carbon dioxide by-product of rotating calciner 5 is purified in a cooler 6 and compressed in compressor 7 for return to the precipitating vessel 2. The water condenser in cooler 6 is recycled to the decomposer 1 and can be used for amalgam decomposition instead of fresh water.

DETAILED DISCUSSION OF THE INVENTION

According to a preferred embodiment of the present invention, an amalgam containing at most 15 kg. of sodium is reacted with a solution containing at most about 11 kg. of $NaHCO_3$ per 100 kg. of water. When these limits are set for the concentration, the precipitation of soda ash is avoided during the amalgam reaction so that separation of soda ash from the mercury is avoided.

In the normal operation of the process the sodium ion concentration of the aqueous solution at the end of the amalgam decomposition is about 6.9 kg. $Na^+$/100 kg. $H_2O$ to 20.5 kg. $Na^+$/100 kg. $H_2O$. In the preferred embodiment of the present invention the sodium ion concentration of the aqueous solution at the end of the amalgam decomposition is about 15.6 kg. $Na^+$/100 kg. $H_2O$ to 20.5 kg. $Na^+$/100 kg. $H_2O$. The normal concentration of sodium bicarbonate in the water at the beginning of the amalgam decomposition is in a weight ratio of about 9.5 kg. $NaHCO_3$/100 kg. $H_2O$ to 21.5 kg. $NaHCO_3$/100 kg. $H_2O$ and the preferred concentration of the sodium bicarbonate in the water is in a weight ratio of about 9.5 kg. $NaHCO_3$/100 kg. $H_2O$ to 16.0 kg. $NaHCO_3$/100 kg. $H_2O$.

According to a preferred embodiment of the invention, the sodium bicarbonate is precipitated from the solution produced by the sodium amalgam reaction at temperatures between 20–60° C. It is especially important in carrying out the process of the present invention that the carbonation produces sodium bicarbonate alone. The fact that the solubility of sodium bicarbonate is lower than that of soda ash is the reason for preventing precipitation during the amalgam reaction. Although the carbonation results in soda ash only above 90° C., it is advantageous to operate at temperatures below about 60° C. so that the formation of small amounts of $Na_2CO_3$ are avoided and easily separable sodium bicarbonate is produced. When these temperature limits are maintained, the sodium hydroxide solution formed from the reaction of water and amalgam and soda ash formed from the sodium bicarbonate are carbonated to sodium bicarbonate substantially quantitatively.

The reaction with the amalgam is generally carried out at a temperature between 30° C. and 100° C. and preferably between 60° C. and 95° C. The carbonation of the $Na_2CO_3$ and NaOH solution resulting from the amalgam is carried out at a temperature between 20° C. and 90° C., preferably between 20° C. and 60° C.

A further embodiment of the present invention provides that the carbon dioxide formed during calcination of the sodium bicarbonate is reused during the precipitation thereof. Sodium bicarbonate obtained after separation of the mother liquor is calcinated in the conventional manner, for example in a rotating calciner, at about 180–200° C. Carbon dioxide and water are produced in addition to the anhydrous soda ash. The carbon dioxide after compression is reused for the carbonation step and is supplemented from the outside by supplying an amount of carbon dioxide equal to the amount of carbon dioxide withdrawn with the soda ash product.

When soda ash is produced from sodium, 1 mole of water is consumed per mole of soda ash. In order to maintain the amount of cycle water constant, the amount of water used is supplemented and added to the sodium bicarbonate solution before the amalgam reaction step.

Without further elaboration, it is believed that one skilled in the art can, using the preceding description, utilize the present invention to its fullest extent. The following preferred specific embodiments are, therefor, to be considered as merely illustrative, and not limitative of the remainder of the specification and claims in any way whatsoever.

The invention is further explained with reference to a specific example in conjunction with the appended flow sheet.

Example

In an amalgam decomposer 1, a sodium amalgam containing 15 kg. of sodium is reacted with 5.9 kg. of water and 105.1 kg. of sodium bicarbonate solution. Instead of fresh water, the condensate from cooler 6 can be used for the decomposition of amalgam. The sodium bicarbonate solution comprises 11 kg. of $NaHCO_3$ and 94.1 kg. of water. During the reaction, a solution is formed containing 13.9 kg. of $NaCO_3$ and 20.9 kg. of NaOH. This solution is pumped into carbonating tower 2 wherein 65.9 kg. of sodium bicarbonate are precipitated from the solution by means of carbon dioxide at 2–4 atmospheres gauge. Precipitation is carried out in the carbonating tower of conventional construction continuously or batchwise, by pumping carbon dioxide from the bottom into the pressure vessel filled with solution. The sodium bicarbonate is separated from the mother liquor by feeding the contents of the pressure vessel into a centrifugal filter 3.

After separation, 105.1 kg. of mother liquor results which contains 11 kg. of $NaHSCO_3$, as well as 60.4 kg. of solid $NaHCO_3$ containing approximately 5.5 kg. of $H_2O$. The filtered mother liquor is collected in a collecting vessel 4 and pumped from there into the decomposer 1.

The soda ash is obtained by heating the moist sodium bicarbonate in a rotating calciner 5 to a temperature of about 180–200° C. 11.4 kg. of steam and 14.4 kg. of $CO_2$ escape. The $CO_2$ is freed from the entrained steam in the cooler 6 and the $CO_2$ is compressed in a compressor 7 together with an aditional amount of carbon dioxide to 2–4 atmospheres gauge. The additional amount of carbon dioxide is somewhat larger than the amount of the reclaimed carbon dioxide and the compressed mixture is introduced into the precipitator vessel 2 from the bottom for the purpose of precipitating the sodium bicarbonate. After the calcining step 34.6 kg. of anhydrous soda ash is obtained.

The preceding example can be repeated with similar success by substituting the generically and specifically described reactants and operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A cyclic process for the production of sodium bicarbonate comprising:
   (a) reacting sodium amalgam with an aqueous sodium bicarbonate solution to form a solution containing sodium carbonate and sodium hydroxide;
   (b) treating said solution containing said sodium carbonate and sodium hydroxide with carbon dioxide and precipitating sodium bicarbonate;
   (c) separating resultant suspension of precipitated sodium bicarbonate into solid sodium bicarbonate and a sodium bicarbonate containing mother liquor; and
   (d) recirculating said mother liquor to said sodium amalgam.

2. The process of claim 1 wherein resultant solution of step (a) contains 15.6 kg. $Na^+$/100 kg. $H_2O$ to 20.5 kg. $Na^+$/100 kg. $H_2O$.

3. A cyclic process for the production of soda ash comprising:
   (a) reacting sodium amalgam with an aqueous sodium bicarbonate solution to form a solution containing sodium carbonate and sodium hydroxide;
   (b) treating said solution containing said sodium carbonate and sodium hydroxide with carbon dioxide and precipitating sodium bicarbonate;
   (c) separating resultant suspension of precipitated sodium bicarbonate into solid sodium bicarbonate and a sodium bicarbonate containing mother liquor;
   (d) recirculating said mother liquor to said sodium amalgam; and
   (e) calcining said sodium bicarbonate to produce said soda ash.

4. The process of claim 3, wherein said sodium amalgam contains up to about 15 kg. of sodium and said aqueous sodium bicarbonate solution contains up to about 11 kg. of $NaHCO_3$ per 100 kg. of water.

5. The process of claim 3, wherein said reacting sodium amalgam and aqueous bicarbonate solution is carried out at a temperature between about 20–60° C.

6. The process of claim 3, wherein additional water is added to the sodium bicarbonate containing mother liquor to compensate for the water consumed during the reaction with sodium amalgam.

7. The process of claim 3 wherein resultant solution of step (a) contains 6.9 kg. $Na^+$/100 kg. $H_2O$ to 20.5 kg. $Na^+$/100 kg. $H_2O$.

8. The process of claim 3 wherein resultant solution of step (a) contains 15.6 kg. $Na^+$/100 kg. $H_2O$ to 20.5 kg. $Na^+$/100 kg. $H_2O$.

9. The process of claim 3, wherein carbon dioxide is formed during said calcining and recirculated to step (b) for treating said solution containing sodium carbonate and sodium hydroxide.

10. The process of claim 9 wherein resultant solution of step (a) contains 6.9 kg. $Na^+$/100 kg. $H_2O$ to 20.5 kg. $Na^+$/100 kg. $H_2O$.

References Cited

UNITED STATES PATENTS

| | | | |
|---|---|---|---|
| 2,336,045 | 12/1943 | Taylor | 204—72 |
| 2,383,674 | 8/1945 | Osborne | 204—87 |
| 2,792,283 | 5/1957 | Hill et al. | 23—64 |
| 2,842,489 | 7/1958 | Svanoe | 204—87 |
| 3,103,413 | 9/1963 | Blumenthal | 23—63 |
| 3,179,579 | 4/1965 | Heinemann et al. | 204—98 X |

OSCAR R. VERTIZ, Primary Examiner

G. T. OZAKI, Assistant Examiner

U.S. Cl. X.R.

23—64

UNITED STATES PATENT OFFICE
CERTIFICATE OF CORRECTION

Patent No. 3,531,240                    Dated Sept. 29, 1970

Inventor(s) Herbert Furkert

It is certified that error appears in the above-identified patent and that said Letters Patent are hereby corrected as shown below:

Column 4 - Line 37, change "$NaCO_3$" to read ...$Na_2CO_3$...

Column 4, Line 49, change "$NaHSCO_3$" to read ...$NaHCO_3$...

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents